Patented Aug. 10, 1937

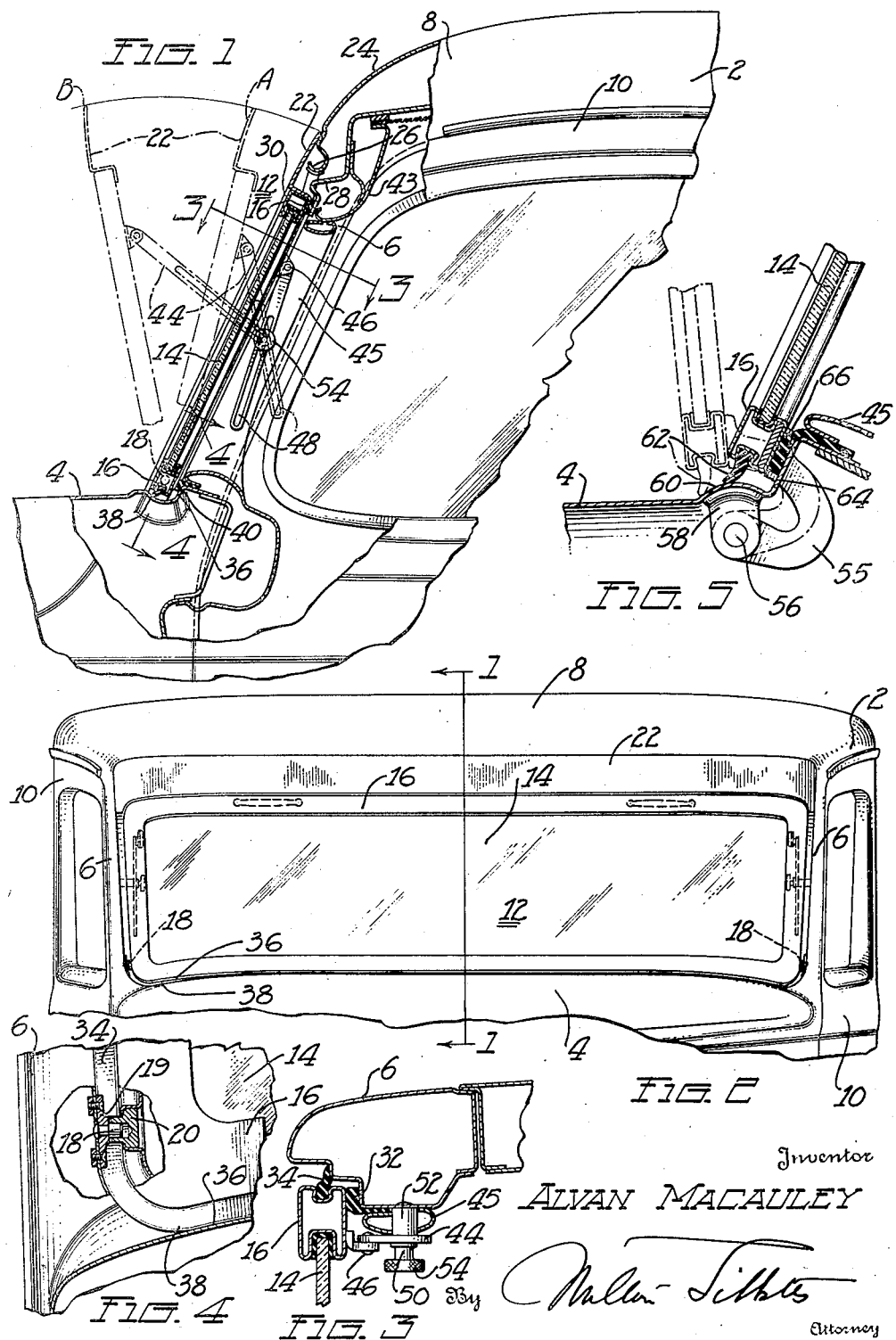

2,089,282

UNITED STATES PATENT OFFICE 2,089,282

MOTOR VEHICLE

Alvan Macauley, Grosse Pointe, Mich., assignor to Packard Motor Car Company, Detroit, Mich., a corporation of Michigan Application June 7, 1934, Serial No. 729,380

11 Claims. (Cl. 296—84)

This invention relates to motor vehicles and more particularly to windshield construction for motor vehicles of the closed type.

One object of the invention is to produce a novel windshield construction by which a motor vehicle of said type may be ventilated in an improved manner.

Another object of the invention is to provide a novel windshield construction in which the windshield may be adjusted to cause the air within a vehicle to be withdrawn by ejector action without the production of drafts.

Another object of the invention is to devise an improved windshield construction in which the windshield may be positioned to form an opening through which the air within the vehicle is withdrawn by ejector action or to form an opening through which the outside air is forced into the vehicle.

With the above and other objects in view the invention consists in a windshield construction embodying the novel and improved features hereinafter described and particularly pointed out in the claims, the advantages of which will be readily understood by those skilled in the art.

The invention will be clearly understood from the accompanying drawing illustrating constructions embodying the invention and the following detailed description of the constructions therein shown.

In the drawing Fig. 1 is a view partly in side elevation and partly in vertical section illustrating a portion of a motor vehicle having a windshield embodying the invention in its preferred form, the section being taken substantially on the line 1—1 of Fig. 2;

Fig. 2 is a view in front elevation of a portion of the motor vehicle showing the windshield construction;

Fig. 3 is a detail sectional view taken substantially on the line 3—3 of Fig. 1;

Fig. 4 is a detail sectional view taken substantially on the line 4—4 of Fig. 1, and Fig. 5 is a detail view in vertical section illustrating a modified windshield construction embodying certain features of the invention.

In the drawing the invention is shown as embodied in a motor vehicle having a body of the closed type indicated as a whole at 2 and comprising a cowl 4, rearwardly slanting pillars 6 extending upwardly from the cowl on opposite sides of the body, a top 8 supported at its forward end on said pillars and doors 10.

In the construction shown in Figs. 1 to 4 inclusive, the vehicle is provided with a windshield 12 mounted in the usual position between the pillars 6 and between the cowl 4 and the forward part of the top. The windshield is arranged to slant rearwardly from the base to the top thereof both when in closed position and when in certain open positions. The location of the windshield in these inclined positions causes the air striking the same during the forward movement of the vehicle to be deflected upwardly over the top.

In accordance with the present invention the windshield is mounted on the body so that it may be adjusted to form an opening between the upper margin of the windshield and the forward part of the top through which air may circulate to ventilate the interior of the body. In the form of the invention illustrated in this application, the windshield is pivoted to turn on an axis located at or adjacent to the base of the windshield to provide for this adjustment.

The windshield comprises a transparent panel 14, the margin of which engages in channels in a frame 16. As shown in Figs. 1 to 4 inclusive the windshield is pivoted upon studs 18 each secured to a bracket 19 mounted on one of the side pillars 6. The studs engage respectively in bearings 20 secured in the side members of the windshield frame. The studs 18 are arranged so that the axis about which the windshield is pivoted is located at or adjacent the base of the windshield. As shown in Fig. 2 the lower edge of the windshield is curved to conform to the curvature of the cowl and the axis of the windshield is located close to the base of the windshield at the center thereof, the lower edge of the windshield curving downwardly away from said axis from the center toward the side margins of the windshield.

At its upper margin the windshield is provided with an extension plate 22 which is convexly curved and overlaps the forward portion of the roof 24 which is also convexly curved, the two curves blending smoothly into each other as shown in Fig. 1. The roof 24 is provided at its forward margin with a drip trough 26. This trough will catch the water which may leak between the overlapping margins of the windshield and roof when the windshield is closed and that which may drip down over the forward margin of the roof when the windshield is opened.

When the windshield is closed the upper part of the frame thereof engages in a recess in the header plate 28 mounted in the top and rests against a yielding cushion strip 30 carried by said plate. The sides of the windshield frame are arranged to engage in recesses in the pillar 6 and rest against yielding cushion strips 32 secured to the pillars. The windshield is provided with weather strips 34 preferably made of rubber, secured to the side portions of the frame and arranged to engage the respective pillars when the windshield is closed to prevent the entrance of water. The lower margin of the windshield engages in a shallow channel 36 formed in the rear portion of the cowl. This channel increases in width from the center toward the sides of the cowl to correspond with the movement of the lower part of the windshield in shifting the same from closed to fully open position. The lower part of the windshield frame is provided with a flexible weather strip 38 preferably made of rubber for engaging the bottom of the channel 36. The lower part of said frame engages a rubber strip 40 interposed between said frame and the adjacent wall of the cowl. The water which runs down the windshield will be caught by the channel 36 and will run off through the ends of said channel at the sides of the cowl.

A molding 43 is secured to the header plate 28 and extends across the forward portion of the top just within the upper portion of the windshield opening. A finishing molding 45 extending about the windshield opening is secured respectively to the molding 43 at the top, to the pillars 6 at the sides and to the cowl at the bottom of said opening.

The above construction enables the windshield to be located in various open positions. In order that the windshield may be held securely in any one of said positions, links 44 are pivoted respectively at 46 to the side members of the windshield frame and each link is formed with a slot 48 in which engages a screw 50 threaded into a nut 52 secured in that part of the molding 45 attached to the adjacent pillar 6. Each screw is provided with a head 54 which engages the corresponding link and clamps the same between said head and the molding.

With the above construction when it is desired to withdraw the air from within the body of the vehicle the windshield is adjusted in a position such as that shown in dot-and-dash lines in Fig. 1 and indicated at A. When in this position the windshield is inclined rearwardly from the base to the upper portion thereof and a relatively narrow opening is formed between the upper edge of the windshield and the forward edge of the roof. When the vehicle is moved in a forward direction, the greater part of the air which strikes the windshield is deflected upwardly by the windshield and when it reaches the upper margin thereof it rushes across the said opening, thereby creating an ejector action which draws the air from within the body of the vehicle. The rapidity of the withdrawal of the air in this manner may be regulated by the adjustment of the windshield to vary the width of said opening. Thus the air in the body of the vehicle may be rapidly changed without the production of drafts.

As the windshield is swung forwardly from closed position, the deflection of the air upwardly is diminished because of the decrease in the inclination of the windshield and there is an increasing tendency to produce eddies or swirls of air over the top of the windshield. In certain positions of adjustment of the windshield providing a relatively wide opening between the top of the windshield and the forward part of the roof, a substantial proportion of the air passing over the top thereof will not cross the opening between the same and the roof but will be deflected into the body of the vehicle by the eddying action. This deflection of air into the body will increase with the distance at which the windshield is adjusted from closed position.

The windshield may be adjusted in a position such as that shown in dotted lines in Fig. 1 and indicated at B. When in this position the windshield is inclined forwardly from the bottom to the top thereof and the greater part of the air striking the windshield during the movement of the vehicle will be deflected downwardly. Air eddies, however, will be produced at the top and sides of the windshield which will cause the outside air to be deflected into the interior of the vehicle.

In addition to the advantages above pointed out the pivoting of the windshield adjacent the base thereof enables the range of vision at the top of the windshield to be increased as compared with the usual construction in which the windshield is hinged at the top. The latter construction requires space at the top for the hinge and the range of vision is cut down to this extent.

Fig. 5 shows another construction for pivotally supporting the windshield to swing about an axis adjacent its base. As shown in Fig. 5 the windshield is provided with arms 55 each pivoted at 56 on a bracket 58 secured to the underside of the cowl. These arms preferably have the formation shown in Fig. 5 and pass through openings 30 in the cowl as shown in this figure. The common axis of the pivots of the arms preferably is below the lower edge of the windshield at the outer sides thereof. The cowl is provided with a convex wall 60 formed on a curve struck from the axis of the windshield and located below the lower part of the windshield frame and said part of the frame carries a weather strip 62 for engaging said convex wall to prevent the entrance of water or air currents between the windshield and said wall. The cowl is provided with a wall 64 extending obliquely upward back of the windshield and the frame of the windshield is arranged to engage a resilient cushion strip 66 overlying this wall when the windshield is in closed position. This construction enables the windshield to be adjusted in substantially the same positions as in the constructions shown in Figs. 1 to 4 inclusive.

It is to be understood that the invention is not limited to the particular construction and arrangement of parts of the illustrated embodiment of the invention but that the construction shown and described is merely illustrative of the invention and that the invention may be embodied in other forms within the scope of the claims.

Having explained the nature and object of the invention and having specifically described a construction embodying the invention in its preferred form, what is claimed is:

1. A construction for motor vehicles comprising a body having a roof, a windshield inclined rearwardly of the vehicle from the bottom toward the top thereof when in closed position and movable from closed position to a similarly inclined open position to provide an opening between the upper portion thereof and the forward portion of the roof, and means on the upper portion of the windshield and the forward portion of the roof for directing the air flow above said opening when the vehicle is moving and thereby causing an ejector action to withdraw air from the vehicle through said opening.

2. A construction for motor vehicles comprising a body having a roof, a windshield inclined rearwardly of the vehicle from the bottom toward the top thereof when in closed position and movable from closed position to a similarly inclined open position to provide an opening between the upper portion thereof and the forward portion of the roof through which the air from within the vehicle is withdrawn by ejector action, and means on the upper margin of the windshield arranged to overlap the forward margin of the roof.

3. A construction for motor vehicles comprising a body having a roof, a windshield inclined rearwardly of the vehicle from the bottom toward the top thereof when in closed position and movable from closed position to a similarly inclined open position to provide an opening between the upper portion thereof and the forward portion of the roof across which the air is deflected by the windshield, the forward portion of the roof having a convexly curved formation and a convexly curved extension on the upper portion of the windshield arranged to meet the curved forward portion of the roof and blend its curvature therewith when the windshield is closed.

4. A construction for motor vehicles comprising a body having a roof, a windshield inclined rearwardly of the vehicle from the bottom toward the top thereof when in closed position and movable from closed position to a similarly inclined open position to provide an opening between the upper portion thereof and the forward portion of the roof through which the air from within the vehicle is withdrawn by ejector action, and a curved extension on the upper part of the windshield arranged to meet and blend with the forward part of the roof when the windshield is in closed position.

5. A construction for motor vehicles comprising a body having an opening in its forward end, a windshield arranged to close said opening, means for pivotally connecting the lower portion of the windshield to the body for swinging movement forwardly of the opening, and means for locking the windshield in open positions or in closed position on its pivotal connections, said windshield opening during a part of its pivotal adjustment being positioned to deflect air rearwardly above the opening to withdraw air from the body through the opening.

6. A construction for motor vehicles comprising a closed type of body having a roof and a forward opening, a windshield structure for closing the body opening, and means pivotally connecting the bottom of said windshield structure to said body, said windshield being swingable forwardly from said opening in a relation to direct air above the opening and thereby create suction to move air through the opening from the interior of the body when the vehicle is moving forwardly.

7. A construction for motor vehicles comprising a closed type of body having a roof, a windshield inclined rearwardly from the bottom portion and having air deflector means along its upper marginal portion arranged to overlap the forward marginal portion of the roof when in closed position, and means for supporting the windshield for forward adjustment to produce an opening between the deflector means and the forward portion of the roof, the position of said deflector when the windshield is open part-way being such as to direct air above the roof of the body over the opening when the vehicle is moving forwardly to withdraw air from the body through the opening.

8. A construction for motor vehicles comprising a closed type of body having a windshield opening in the forward end thereof, an adjustable windshield structure adapted to open and close the opening in said body, pivot means connecting the bottom portion of said windshield structure with said body, the top portion of said windshield structure moving forwardly of the opening as it is swung on its pivot, and means securing said windshield in desired pivotally adjusted position.

9. A construction for motor vehicles comprising a closed type of body having a front end wall slanting rearwardly from the base, said front end wall having a windshield opening therethrough, a windshield structure adapted to close the opening in said front end wall, and means pivoting the bottom of the windshield structure to the body adjacent the bottom of the opening in the front end wall, said windshield structure being adjustable in advance of the front end wall of the body and the upper marginal portion to swing in an arc adjacent the front end wall having its lowermost end at the point where the opening is closed.

10. A construction for motor vehicles comprising a closed type of body having an opening in the front end wall, the windshield structure mounted to close the front end opening and to swing in advance thereof from its bottom portion, said windshield structure extending above the opening when in closed position and in adjusted positions adjacent the opening, and means for fixing the windshield structure in its adjusted positions.

11. A construction for motor vehicles comprising a closed type of body having a front end wall with an opening therein, a windshield structure for closing the opening in the front end wall, means on the upper marginal portion of the windshield structure extending above the opening in the front end wall, means for pivoting the bottom portion of the windshield structure to the body, and sealing means between the bottom marginal portion of the windshield structure and the vehicle body, such sealing means being movable and arranged to seal the space between the bottom marginal portion of the windshield structure and the body in any pivotal position of windshield structure adjustment.

ALVAN MACAULEY.

CERTIFICATE OF CORRECTION.

Patent No. 2,089,282.                               August 10, 1937.

ALVAN MACAULEY.

It is hereby certified that error appears in the printed specification of the above numbered patent requiring correction as follows: Page 3, first column, line 46, claim 5, strike out the word "opening"; and that the said Letters Patent should be read with this correction therein that the same may conform to the record of the case in the Patent Office.

Signed and sealed this 5th day of October, A. D. 1937.

Henry Van Arsdale

Acting Commissioner of Patents.

(Seal)